United States Patent [19]

Takahashi et al.

[11] Patent Number: 4,464,011
[45] Date of Patent: Aug. 7, 1984

[54] LIGHT BEAM SCANNING APPARATUS AND THE METHOD

[75] Inventors: Kensaku Takahashi, Hiratsuka; Yasuo Yatsugake, Odawara; Fukuo Iwaya, Tokyo; Makoto Ito, Hadano; Katsumi Takami, Tokyo; Kyo Suda, Hachioji, all of Japan

[73] Assignees: Hitachi, Ltd.; Hitachi Electronics Engineering Co., Ltd., both of Tokyo, Japan

[21] Appl. No.: 406,044

[22] Filed: Aug. 6, 1982

[30] Foreign Application Priority Data

Oct. 30, 1981 [JP] Japan .................. 56-173010

[51] Int. Cl.³ .............................. G02B 27/17
[52] U.S. Cl. ....................... 350/6.1; 350/6.8
[58] Field of Search ................ 350/6.1, 6.5, 6.8

[56] References Cited

U.S. PATENT DOCUMENTS 4,196,961  4/1980  Walter et al. .................. 350/6.8

Primary Examiner—John K. Corbin
Assistant Examiner—Rebecca D. Gass
Attorney, Agent, or Firm—Antonelli, Terry & Wands

[57] ABSTRACT

A light beam scanning apparatus projects a light beam swept by a light scanner to a spherical mirror and scans by a light beam spot reflected and focused by the spherical mirror a surface of an object arranged to oppose to the spherical mirror at a position spaced from the spherical mirror by a distance equal to a focal distance f of the spherical mirror. An optical path length between the light scanner and the spherical mirror is set to 0.78 f–0.84 f to minimize a curvature of field (circle of confusion).

8 Claims, 20 Drawing Figures

LIGHT BEAM SCANNING APPARATUS AND THE METHOD

BACKGROUND OF THE INVENTION

1. Field of the Invention

The present invention relates to a light beam scanning apparatus and a method for sweeping and scanning a light beam such as a laser beam on an object surface.

2. Description of the Prior Art

With the recent advancement of laser technology, a scan system of an object by a laser beam has been utilized in the field of instrumentation. The laser beam has an advantage that even a small power beam can be focused to a small diameter spot having a high light intensity.

FIGS. 1A to 1C show a prior art laser spot scanning system which uses a conventional simple scanning lens in a surface defect detecting apparatus for detecting defects or dusts on a surface of a silicon wafer of a semiconductor device. A laser beam 1 is angularly swept within an scanning angle of $\pm\theta$ by a scanner 2 such as a vibrating mirror and focused by a scanning lens 3 so that a line 5 is scanned by a laser spot on an object 4. By moving the object 4 in a y-axis direction while scanning the laser spot in an x-axis direction, a whole area of the object 4 is scanned.

An optical lens usually includes more or less aberrations such as spherical aberration. When such an optical lens is used as the scanning lens 3, a variation of a spot diameter or a distortion of a spot shape takes place depending on the scan angle $\theta$ or a spot position. FIG. 1C shows a curvature of field which results in the variation of the spot diameter. As the scan angle $\theta$ increases, a focusing point Q of the laser beam is moved toward the light source away from the object plane 4 so that a locus 6 of the focusing point Q is curved. As a result, the spot diameter $d_c$ of the spot P on the object 4 becomes larger than that when the scan angle $\theta$ is zero. That is, a variation takes place in the spot diameter $d_c$.

While the variation in the spot diameter in the scanning direction (x-axis) has been discussed above, a variation also takes place in the direction (y-axis) orthogonal to the scanning direction. As a result, a circle of confusion is produced on the object 4. Since the degrees of variation in the x-axis direction and the y-axis direction are usually different, the circle of confusion is usually non-circular.

The variation of the spot size naturally results in a variation of light intensity. Thus, in a system for measuring a size of a defect by measuring a light intensity of a scattered light resulting from the defect, defects of a same size will be detected as of different size depending on the position of the spot on the object 4.

The size of the object 4 such as a silicon wafer has been increased from several tens mm in diameter in an early stage to 100 mm in diameter in present days and will be increased to 125 mm in diameter in near future. On the other hand, in the laser spot scanning system shown in FIGS. 1A-1C, when the spot size is approximately 15 $\mu$m in diameter, an allowable scan range having a small variation in the spot diameter may be only 20 mm at most. Thus, in the prior art, a zone-split scanning system is used in which the object 4 is split into a plurality of zones and the respective zones are sequentially scanned to complete the scan or detection of the whole area. Thus, a long inspection time is required. This has been a neck in a production line.

Thus, an optical lens which results in a small variation in the spot diameter over a wide scan width has been desired. A scanning lens called an "f$\theta$ lens" has been known which aims to improve an f$-\theta$ characteristic, that is, a linearity of a spot position to a scanning angle $\theta$. However, it does not always provide an optimum condition to the variation of the spot diameter and the shape of the circle of confusion and complex in construction. In addition, since a compound lens system including the f$\theta$ lens is expensive, it is not suitable to use in the surface defect detecting apparatus which requires a large diameter lens.

A scanning system which uses a concave mirror has also been known. The concave mirror is much more inexpensive than an optical lens of the same diameter and can provide a scanning system having a satisfactory spot size and variation of the spot size by appropriately selecting parameters of the optical system such as an incident angle. Japanese published patent application No. 55-36127 entitled "Optical Scanning Apparatus" discloses the use of a parabolic mirror as the concave mirror and the arrangement of a scanner at a specific position in accordance with a focal distance f of the parabolic mirror in order to minimize the aberration such as the circle of confusion.

FIGS. 2A and 2B show a construction of the light beam scanning apparatus in accordance with the above-mentioned patent application. A parabolic mirror 7 having a focal distance f is arranged to oppose to an object 4 and a scanner mirror 2 is arranged at a specific position between the parabolic mirror 7 and the object 4. The laser beam 1 is angularly swept by the scanner 2 and reflected and focused by the parabolic mirror 7 so that a spot P having a very small circle of confusion scans the surface of the object 4.

In order to prevent the scanner 2 from interfering an optical path of the beam reflected from the parabolic mirror 7, an optical path from the scanner 2 to the parabolic mirror 7 is inclined by an angle $\Omega_o$ in a y-axis sectional plane. The scanner 2 is positioned on a center axis (z-axis) of the parabolic mirror 7 which is normal to the object plane 4 and the optical path or axis is inclined by the angle $\Omega_o$. An effective working range of the parabolic mirror thus does not include a center 0 of the parabolic mirror 7. This is called an off-axis configuration.

Various aberrations or variations (which are hereinafter simply referred to as aberrations) are included in the light beam scanning system. They include the circle of confusion described above as well as the distortion or the non-linearity of the locus of spot which is to be corrected by the f$\theta$ lens. In practice, depending on the object and the usage of an application apparatus or an instrumental apparatus, one or all of those aberrations must be eliminated. For example, in a facsimile art, the three aberrations mentioned above must be eliminated to maintain a high quality of image. In the surface defect detecting apparatus which the present invention is to be applicable, the curvature of field must be highly eliminated but the distortion and the non-linearity of the locus of spot need not be completely eliminated so long as they are not too large because they can be compensated by a system configuration.

Regarding the aberrations in the light beam scanning system which uses the concave mirror, it is considered necessary for attaining the high performance laser spot scan not to limit the concave mirror to the parabolic mirror and to consider the aberrations for the angle $\Omega_o$ of the inclination of the optical path or axis to the concave mirror in the off-axis configuration and to select a light beam scanning system which meets the requirements.

SUMMARY OF THE INVENTION

It is, therefore, an object of the present invention to provide light beam scanning which uses a concave mirror other than a parabolic mirror and exhibits a very small curvature of field (circle of confusion).

In order to achieve the above object, in accordance with an embodiment of the present invention, there is provided a light beam scanning apparatus in which a light beam swept by a light scanner is projected to the concave mirror and a spot of the light beam reflected and focused by the concave mirror scans a surface of an object which is arranged to oppose the concave mirror and positioned at a distance therefrom substantially equal to a focal distance f of the concave mirror, wherein the concave mirror is spherical mirror and an optical path length between the light scanner and the spherical mirror is set between 0.78 f and 0.84 f.

In accordance with a characteristic structure of the present invention, the light beam scanning apparatus which exhibits a very small curvature of field (circle of confusion) and an excellent characteristic is provided.

BRIEF DESCRIPTION OF THE DRAWINGS

FIGS. 10A to 10C show an optical configuration of one embodiment of the light beam scanning apparatus of the present invention, in which FIG. 10A is a front view, FIG. 10B is a side view and FIG. 10C is a plan view.

DESCRIPTION OF THE PREFERRED EMBODIMENT

Principles of the present invention will be first explained. For the purpose of comparison with the prior art parabolic mirror, the circles of confusion for the spherical mirror and for the parabolic mirror, both of which are typical concave mirrors, are analyzed by a three-dimensional geometrical optics. In the following description, the light beam is not limited to the laser beam but dealt with as a general light beam.

As described above, the diameter of the circle of confusion differs depending on the direction and hence the diameters in two orthogonal directions, for example, in x-direction and y-direction should be considered. In the following description, the diameters in the x-direction and the r-direction in a polar coordinate are considered. The r-direction is equal to the y-direction when the scanning angle $\theta$ is small.

Figure 3A:
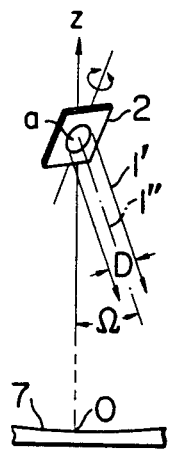
FIGS. 3A to 3C show charts for analyzing a diameter of circle of confusion in a direction of r.
Figure 3B:
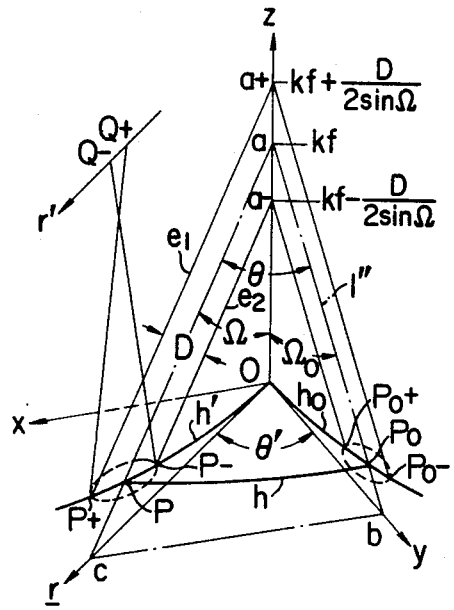
Figure 3C:
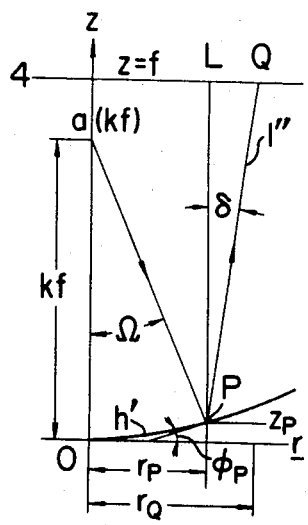

FIGS. 3A–3C show coordinate charts for discussing the circle of confusion in the r-direction. The scanner 2 is positioned at a point a on the z-axis. The z-axis coordinate z of the point a is kf where f is a focal distance of the concave mirror 7 and k is a proportional coefficient ($0 < k \leq 1$). A parallel light beam 1' having a diameter D is directed downward at an angle $\Omega$ with the z-axis and swept in a scanning angle $\theta$ as shown in FIG. 3B. A center axis 1'' of the light beam 1' passes through the point a and intersects with the y-axis at a point b when $\theta = 0$ and at a point c when the scanning angle is $\theta$. Thus, a vibrating plane abc is defined by the angular sweep of the center axis 1''. On the other hand, the concave mirror 7 is positioned with a center 0 thereof being at an origin 0 of the xyz coordinates. The vibrating plane abc intersects with the concave mirror 7 on a curve h. A point P on the curve h when the instantaneous scanning angle is $\theta$ defines a reflection point of the center axis 1'' at the instantaneous scanning angle $\theta$.

Angles in the xyz coordinates are defined as shown in FIG. 3B.

<abc = $\theta$ (scanning angle),
<Oab = $\Omega_o$ (off-axis angle),
<Oac = $\Omega$ and
<bOc = $\theta'$.

When the scanning angle $\theta$ and the off-axis angle $\Omega_o$ are given, the angles $\Omega$ and $\theta'$ can be readily determined by calculation.

The angle of direction of the reflected light at the point P is determined by the gradient angle $\Omega$ and an angle (tangential angle) $\phi_p$ between a tangent of the reflection plane at the point P and the xy plane. In FIG. 3C, the reflected light 1'' is directed upward at an angle of $\delta = \Omega - 2\phi_p$ with respect to the normal direction and projected to a point Q on the scan plane 4 spaced from the concave mirror 7 by the focal distance f.

In preparation for the determination of the diameter of the circle of confusion, the determination of the coordinate of the point Q for the center axis 1'' is explained.

Assuming that the concave mirror 7 is the parabolic mirror, a coordinate $r_p$ of the reflection point P is determined by the following two equations relating to a height $z_p$ of the point P.

Assuming that a curve h' connecting the origin O and the point P is a parabola, the following equation is met:

$$z_p = r_p^2/4f \quad (1).$$

In FIG. 3C, the following equation is met:

$$z_p = kf - r_p \cot \Omega \quad (2).$$

By equalizing the equations (1) and (2) and solving the quadratic equation with respect to $r_p$, we get $$r_p = 2f(-\cot \Omega + \sqrt{\cot^2 \Omega + k}) \quad (3).$$

The equation (3) shows an application of the proposed concept mentioned before to the off-axis configuration.

The coordinate of the point Q is now considered. When the polar coordinate is used, an angular coordinate $\theta'$ of the point Q is equal to that of the point P because of the axial symmetry of the parabolic mirror. In FIG. 3C, an r-coordinate $r_Q$ is given by $$r_Q = r_p + (f - z_p) \tan \delta$$
$$\delta = \Omega - 2\phi_p \quad (4)$$

where the tangential angle $\phi_p$ is derived by differentiating the equation (1) of the curve h' by r. From the equation (3), we get $$\tan \phi_p = \left(\frac{dz}{dr}\right)_{r_p} = r_p/2f = (-\cot \Omega + \sqrt{\cot^2 \Omega + k}\,). \quad (5)$$

Next, let us assume that the concave mirror 7 is a spherical mirror. In this case, strictly speaking, the coordinates $r_p$ and $z_p$ of the reflection point P do not correspond to those for the parabolic mirror.

Figure 4:
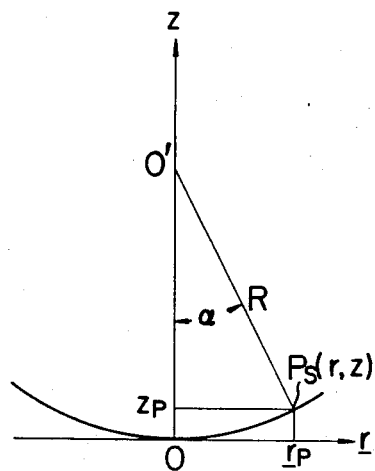
FIG. 4 illustrates the derivation of a spherical equation.

Thus, it is necessary to determine the coordinate $r_p$ and $z_p$ by equations for the spherical mirror. Because of the symmetry of the spherical mirror, the variables r and z can be handled in quadratic equations as shown in FIG. 4.

A spherical mirror has a radius R and a center 0'. The origin of the coordinates is set at the center 0 of the spherical mirror. Coordinates $r_p$ and $z_p$ of a reflection point $P_s$ meet the following equation because R=2f and by omitting higher order terms when the angle $\alpha$ is small $$z_p = \frac{r_p^2}{4f}\left[1 + \left(\frac{r_p}{4f}\right)^2\right]. \quad (6)$$

From the equations (6) and (2), $r_p$ and $z_p$ are determined. From the equation (4), $r_Q$ for the spherical mirror is determined. In this case, however, the tangential angle $\phi_p$ in the equation (4) should be modified to be a tangential angle of the spherical mirror at the reflection point $P_s$, and the following equation is derived by differentiating the equation (6) by r. In order to distinguish the parabolic mirror from the spherical mirror, the symbols for the spherical mirror are accompanied with primes "'".

$$\tan \phi_p' = \left(\frac{dz'}{dr}\right) r_p' = \frac{r_p'}{2f}\left[1 + \frac{1}{2}\left(\frac{r_p'}{2f}\right)^2\right] \quad (7)$$

Having prepared the above equations, an equation for the circle of confusion in the r-direction is now derived in FIGS. 3A-3C. In FIG. 3B, $e_1$ and $e_2$ denote outer enveloped lines, in the r-direction, of the light beam having the diameter D. They can be regarded as if they emanated from points $a_+$ and $a_-$ ($a_\pm$) on the z-axis. Reflection points of the outer enveloped lines $e_1$ and $e_2$ at points $P_\pm$ and the r-coordinates thereof are represented by $r_{p\pm}$ which are derived by substituting k in the equation (3) for the parabolic mirror by $(k \pm D/2f \sin \Omega)$ for the points $a_\pm$. From $r_{p\pm}$ and the equations (1), (4) and (5), $r_{Q\pm}$ for the points $Q_\pm$ are determined. A diameter $\Delta r$ of the circle of confusion in the r-direction is calculated from an equation $$\Delta r = r_{Q+} - r_{Q-} \quad (8).$$

When the concave mirror is the spherical mirror, the spherical equation (6) instead of (1) is used and kf in the equation (2) is substituted by (kf±D/2 sin $\Omega$) for the points $a_\pm$ to determine $r'_{P\pm}$. When $r'_{P\pm}$ are determined, $r_{P\pm}$ by the equation (3) for the parabolic mirror can be approximately applied to the spherical mirror when the angle $\Omega$ is small because difference between $r_{P\pm}$ for the parabolic mirror and $r'_{P\pm}$ for the spherical mirror is very small. From $r'_{P\pm}$ and the equation (7), a tangential angle $\phi_p'$ is determined, and from the equation (4), $r'_{Q\pm}$ is determined. Thus, the radius $\Delta r'$ of the circle of confusion in the r-direction for the spherical mirror is determined by $$\Delta r' = r'_{Q+} - r'_{Q-} \quad (9).$$

Figure 5A:
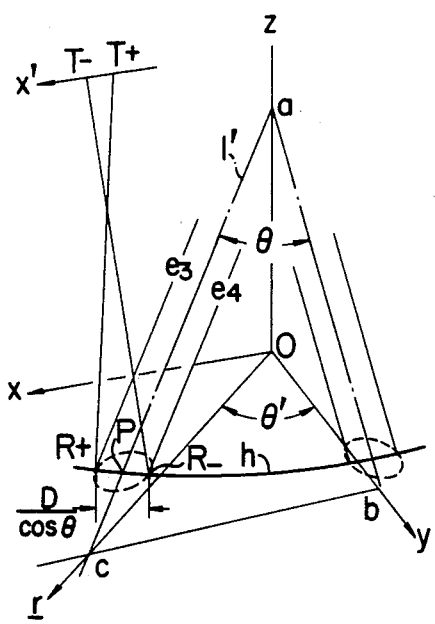
FIGS. 5A and 5B show charts for analyzing a diameter of circle of confusion in a direction of x.
Figure 5B:
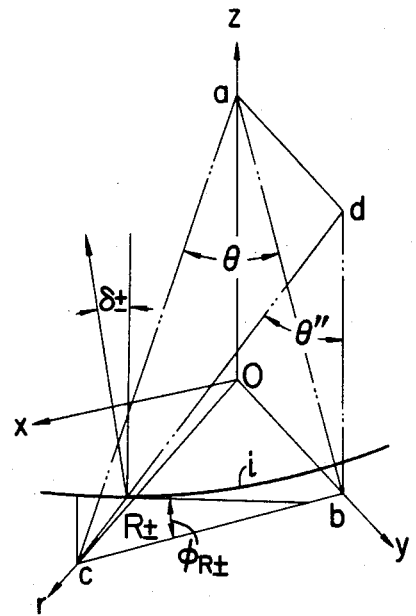

FIGS. 5A and 5B show coordinate charts for considering the radius of the circle of confusion in the scan direction (x-direction). A vibrating plane abc of a center axis 1' of the light beam intersects the concave mirror 7 on a curve h. Coordinates of cross-points $R_\pm$ of outer enveloped lines $e_3$ and $e_4$, in the x-direction, of the light beam with the curve h are now considered. The coordinates $r_p$ of the reflection point P for the center axis 1' for the parabolic mirror and the spherical mirror have been determined. The x-coordinates of the points $R_\pm$ are determined by adding or subtracting D/2 cos $\theta$ to or from the x-coordinate of the point P. That is, $$\left.\begin{array}{l}x_{R\pm} = r_p \sin \theta'_\pm (D/2 \cos \theta) \text{ (parabolic mirror)} \\ x'_{R\pm} = r'_p \sin \theta'_\pm (D/2 \cos \theta) \text{ (spherical mirror)}\end{array}\right\} \quad (10)$$

The outer enveloped lines $e_3$ and $e_4$ reflected at the reflection points $R_\pm$ intersect the scan plane 4 of z=f at points $T_\pm$. In order to determine the radius of the circle of confusion in the x-direction, let us consider only the x-coordinates of the points $T_\pm$. At the reflection points $R_\pm$, tangential angles in the x-direction are necessary. They are derived by partially differentiating the equation (1) for the parabolic mirror and the equation (6) for the spherical mirror by x.

$$\tan \phi_{R\pm} = x_{R\pm}/2f \text{ (parabolic mirror)} \quad (11)$$

$$\tan \phi'_{R\pm} = \frac{x'_{R\pm}}{2f}\left\{1 + \frac{1}{2}\left(\frac{r'_{R\pm}}{2f}\right)^2\right\} \text{(spherical mirror)} \quad (12)$$

The x-coordinates of the points $T_\pm$ are determined by the points $R_\pm$ and reflection angles $\delta$ to the x-direction at the points $R_\pm$ and they are independent to the y-coordinates of the points $R_\pm$. The reflection angles $\delta_\pm$ at the points $R_\pm$ are determined as follows from a projection plane abc of the vibrating plane abc parallel to the xz plane, as shown in FIG. 5B.

$$\delta_\pm = \theta'' - 2\phi_{R\pm}, \quad \delta'_\pm = \theta'' - 2\phi'_{R\pm} \quad (13)$$

where $\theta''$ is a projection angle of the angle $\theta$ to the xz plane, and a curve i is a projection curve of the curve h to the xz plane.

From the above, the coordinates $x_{T\pm}$ and $x'_{T\pm}$ of the points $T_\pm$ and the radius $\Delta x$ of the circle of confusion in the x-direction are given by the following equations.

$$\left.\begin{array}{l} x_{T\pm} = x_{R\pm} + (f - Z_{R\pm})\tan\delta_\pm \\ \Delta x = x_{T+} - x_{T-} \end{array}\right\} \text{ (parabolic mirror)} \quad (14)$$

$$\left.\begin{array}{l} x'_{T\pm} = x'_{R\pm} + (f - Z'_{R\pm})\tan\delta'_\pm \\ \Delta x' = x'_{T+} - x'_{T-} \end{array}\right\} \text{ (spherical mirror)} \quad (15)$$

FIGS. 6 to 8A and 8B show curves derived from the equations for the radii of the circles of confusion $\Delta r$, $\Delta r'$, $\Delta x$ and $\Delta x'$ when appropriate numbers are given thereto with f=350 mm and D=7 mm. Since the radius of the circle of confusion is substantially independent to f, $\Omega_o$ and approximately proportional to D (although proof thereof is omitted), those examples have generality. In the calculations in FIGS. 6 to 8A and 8B, the sign of the radius of the circle of confusion is negative when a focusing point is in front of the scan plane and positive when it is behind the scan plane.

Figure 6:
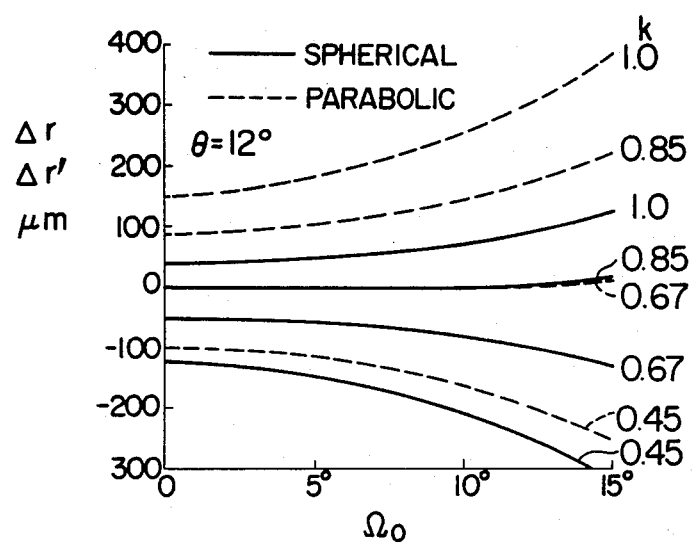
FIG. 6 shows characteristic curves of diameters $\Delta r$ ($\Delta r'$) of circles of confusion versus off-axis angle $\Omega_o$ for a spherical mirror and a parabolic mirror.

FIG. 6 shows the radii $\Delta r$ and $\Delta r'$ of the circles of confusion in the r-direction versus the off-axis angle $\Omega_o$ for various proportional coefficients k with the scanning angle being fixed to 12°. As a whole, there is a similarity between the curves for the parabolic mirror and the curves for the spherical mirror for different values of k. For the parabolic mirror, $\Delta r$ is zero independently of $\Omega_o$ when $k\approx 0.67$, and for the spherical mirror, $\Delta r'$ is zero when $k\approx 0.85$. Thus, it is possible to make the radius of the circle of confusion (in the r-direction) to be zero for both the parabolic mirror and the spherical mirror by constructing the optical system with appropriate values of k. Furthermore, it is a very advantageous feature in the application that the radius of the circle of confusion is zero independently of the off-axis angle $\Omega_o$.

Figure 7A:
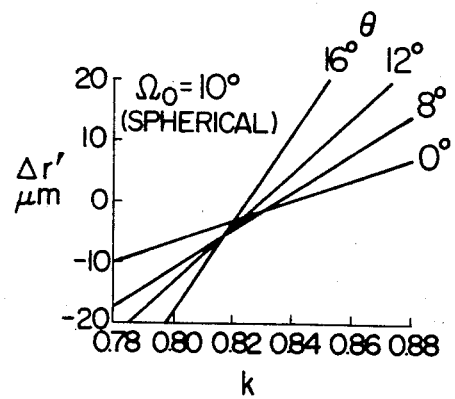
FIGS. 7A and 7B show detailed characteristic curves of diameters $\Delta r$ ($\Delta r'$) of circles of confusion versus proportional coefficient k.
Figure 7B:
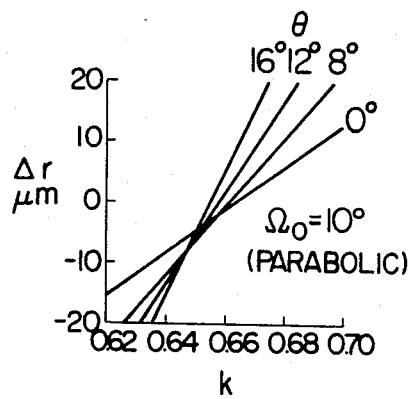

However, from a microscopic viewpoint, the value of k which makes $\Delta r$ or $\Delta r'$ to be zero is not independent to the scanning angle $\theta$ but slightly varies with $\theta$. This is illustrated in FIGS. 7A and 7B, in which $\Omega_o = 10°$. As shown, there is a tendency that the value of k which provides zero radius for the parabolic mirror and the spherical mirror decreases as the angle $\theta$ increases from 0°.

Figure 8A:
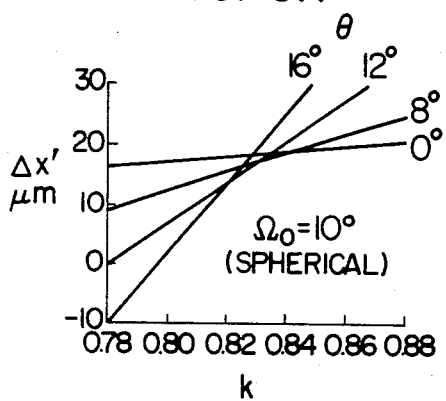
FIGS. 8A and 8B show detailed characteristic curves of diameters $\Delta x$ ($\Delta x'$) of circles of confusion versus proportional coefficient k.
Figure 8B:
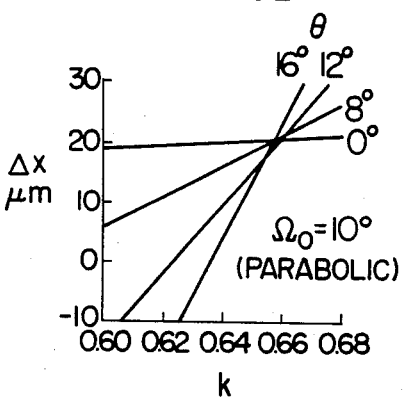

On the other hand, FIGS. 8A and 8B ($\Omega_o = 10°$) show that the radii $\Delta x$ and $\Delta x'$ of the circles of confusion in the x-direction can be made to zero by appropriately selecting the value k. In this case, however, the value of k which provides zero radius for the parabolic mirror and the spherical mirror increases as the angle $\theta$ increases, as compared to the radius of the circle of confusion in the r-direction.

For a given scanning angle $\theta$, the value of k which provides zero radius in the r-direction may substantially differ from that in the x-direction. It is thus seen that it is not possible to make the radii of the circle of confusion in the r-direction and the x-direction to be zero by a single value of k. For example, at $\theta = 12°$, $\Delta r' \approx 0$ when k=0.83 and $\Delta x' \approx 0$ when k=0.78. The similar circumstance is observed also for the parabolic mirror.

Figure 1A:
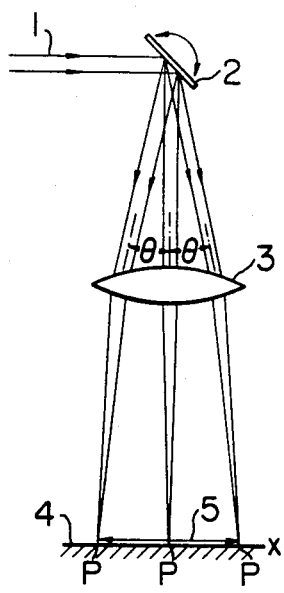
FIGS. 1A to 1C show schematic diagrams of a prior art laser spot scanning system which uses a single lens and illustrate a resulting distortion.
Figure 1B:
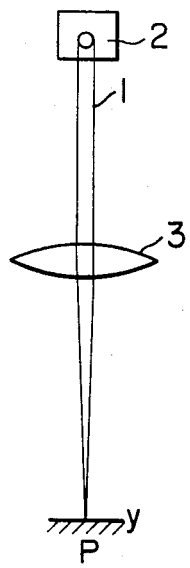
Figure 1C:
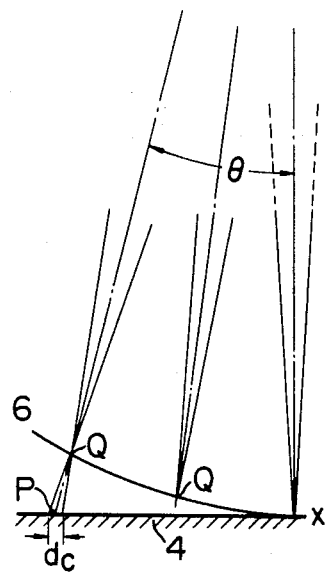
Figure 2A:
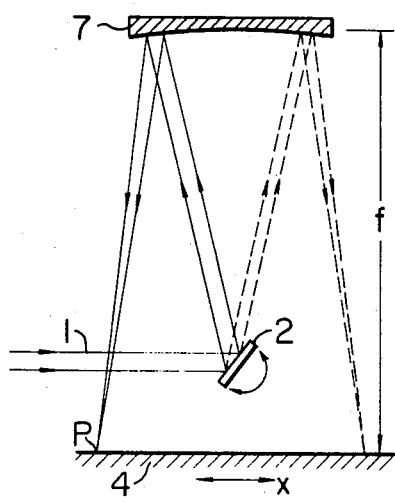
FIGS. 2A and 2B show schematic diagrams of a prior art light beam scanning system which uses a parabolic mirror.
Figure 2B:
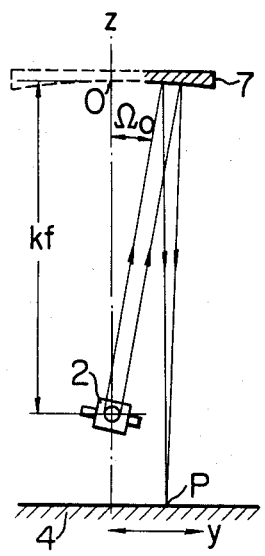

In the construction of the light beam scanning system shown in FIGS. 2A and 2B, a single specific value of k should be selected, but such a value of k cannot make both $\Delta r'$ and $\Delta x'$ to be zero as discussed above.

Now, turning back to the object of the present invention, a condition which satisfies the uniformity of the intensity of the light spot is considered. As discussed at the beginning, when the spot area varies, the light intensity varies in inverse proportion to the area. Accordingly, the variation of the area of the circle of confusion should be considered and the discussion should be made to prevent variations of the area.

The circle of confusion is non-circular and it is assumed that it approximates an ellipse having a major axis of $2a$ and a minor axis of $2b$ and an area of $\pi\{(a+b)/2\}^2$, where $\{(a+b)/2\}$ is an average radius of the ellipse. Thus, an average radius of the radii $|\Delta r|$ and $|\Delta x|$ of the circle of confusion gives an equivalent diameter of the circle of confusion when it is circular and it may be used as an index to indicate a variation of the light intensity of the light spot.

Figure 9:
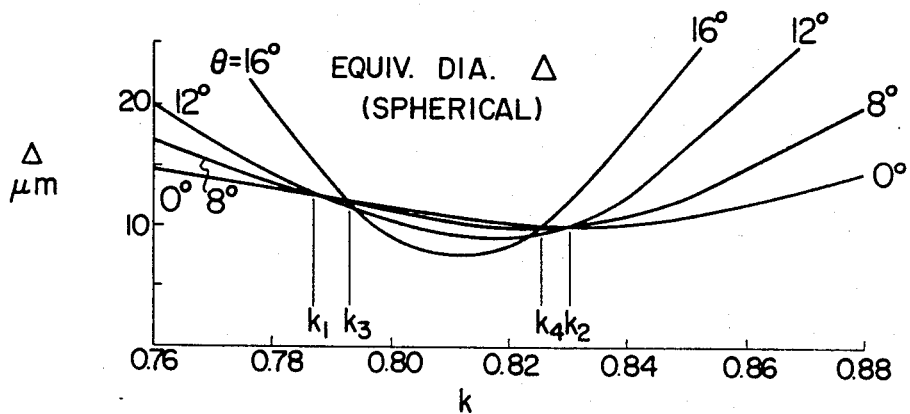
FIG. 9 shows curves for average diameters (equivalent diameters) of circles of confusion in the direction of r in the spherical mirror for parameters k.

FIG. 9 shows curves of equivalent diameters $\Delta$ of the circles of confusion for various proportional coefficients k, derived from the data of FIGS. 7A and 8A. The scanning angle as a parameter is within a range of 0°–16°.

When the scanning angle $\theta$ is no larger than 12° (a total scanning angle is no larger than $\pm\theta$ or 24°) and k is selected from a range of $0.78 \leq k \leq 0.84$, the variation of the equivalent diameter $\Delta$ is within 10%. Three curves for $\theta = 0°$, $\theta = 8°$ and $\theta = 12°$, respectively, cross at $k_1 \approx 0.786$ and $k_2 \approx 0.830$. Thus, if the optical system can be finely adjusted to have the values $k_1$ and $k_2$, the variation of the equivalent diameter is very small within the range of $\theta = 0° \sim \theta = 12°$ and hence the light intensity of the spot is kept very uniform.

When the scanning angle $\theta$ is expanded to 16° (total scanning angle of 32°), the equivalent diameter abruptly changes at $\theta = 16°$ and hence the value of k should be finely adjusted to $k_3 \approx 0.793$ or $k_4 \approx 0.825$ shown in FIG. 9. While not shown, it is known that when the scanning angle $\theta$ is 20° or 24°, the curves for the various scanning angles substantially cross in the vicinity of k=0.79.

When the scanning angle of 12° is used, the variation of the equivalent diameter is large beyond the above range of k, that is, when k<0.78 or k>0.84, and the variation of the light intensity of the spot abruptly increases. For example, when k=0.76 or k=0.85, a ratio of the light intensities at the extreme ends is as large as two. Such a large variation is not suitable to the surface defect detecting apparatus.

In accordance with the present invention, in the light spot scanning system shown in FIGS. 2A and 2B, the spherical mirror is used as the concave mirror 7 and the proportional coefficient k is selected to a specific one between 0.78 and 0.84 so that the variation of the equivalent diameter of the circle of confusion is minimized over a wide scan range. Consequently, the scan spot having a small variation in the light intensity is provided in accordance with the present invention. When this teaching is applied to the laser spot scanning system of the surface defect detecting apparatus, ununiformity of sensitivity due to the variation of the spot diameter is prevented.

By way of reference, other aberrations, that is, the curvature of field and the non-linearity of the spot locus (arc-locus) in the laser spot scanning system of the present invention are briefly discussed.

The curvature of field is no more than 0.5% within the range of scanning angle $\theta$ of 0°–16° and it raises no problem in the surface defect detecting apparatus. The curvature of field is independent of the focal distance f, the beam diameter D and the off-axis angle $\Omega_o$ and dependent on the proportional coefficient k.

The non-linearity of the spot locus most largely depends on the off axis angle $\Omega_o$ and also depends on the proportional coefficient k. For example, when $\Omega_o=10°$, k=0.85, f=350 mm and the scan width is 300 mm, the deviation from a linear line is as small as 2 mm. Thus, it does not raise a big problem.

Figure 10A:
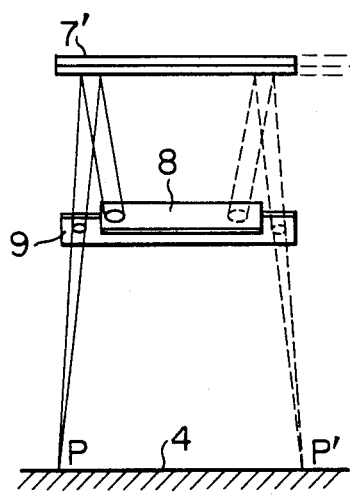
Figure 10B:
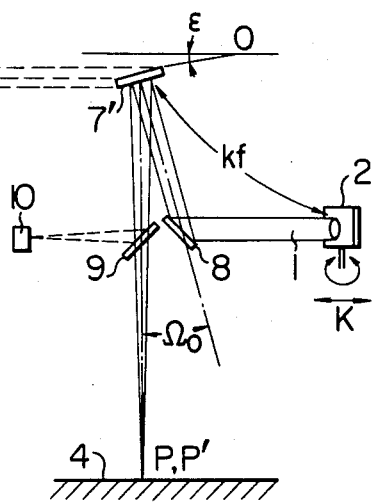
Figure 10C:
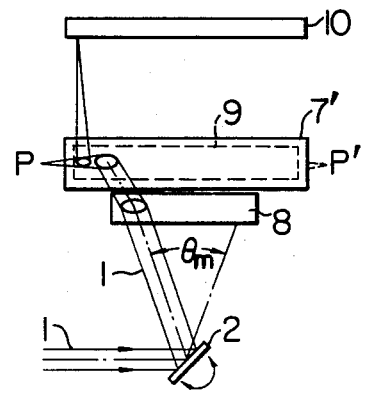

A specific embodiment of the present invention is now described. FIGS. 10A-10C illustrate an application of the light beam scanning apparatus of the present invention to the surface defect detecting apparatus. The laser beam 1 is swept by the scanner 2 within the maximum scanning angle $\theta_m$, reflected upward by the mirror 8 and reflected downward by the spherical mirror 7' to produce the spot P on the scan plane 4. The spherical mirror 7' is of rectangular shape which is cut out from the sphere to leave an area necessary to the scan and has the scanning direction along a longitudinal axis. The off-axis angle $\Omega_o$ shown in FIG. 10B is defined so that the mirror 8 does not interfere in the optical path, and the spherical mirror 7' is inclined by an angle $\epsilon$ to a horizontal plane so that the laser beam directed downward from the spherical mirror 7' is directed normally.

It is important to note that a mechanism for finely adjusting the scanner 2 in the direction of an arrow k is provided so that the optical path length between the scanner 2 and the spherical mirror 7' is set to kf ($0.78 \leq k \leq 0.84$) where f is the focal distance of the spherical mirror 7' and the value k is selected to an optimum value depending on a maximum angle $\theta_m$ of the scanning. It can be seen that kf designates the optical distance or extended length of optical path.

The distance between the spherical mirror 7' and the scan plane 4 is basically equal to the focal distance f of the spherical mirror 7'. In order to provide a tolerance of the focal distance f permitted to the spherical mirror 7', a fine adjusting mechanism for the distance between the scan plane 4 and the spherical mirror 7' is provided, although it is not shown in FIG. 10. Thus, the distance between the scanner and the mirror in the optics configuration is set substantially equal to the focal length f.

In the present embodiment, a transparent glass plate 9 is obliquely arranged in the optical path between the spherical mirror 7' and the scan plane 4 to direct a portion (approximately 4%) of the scanning laser beam to a position sensor 10 arranged on one side thereof to detect the spot position. A position of a defect detected can be specified by a signal from the position sensor 10. This technique can be effectively used in the defect detection data processing.

As described hereinabove, the present invention provides the light beam scanning apparatus which provides the light spot having a small variation of the light intensity on the scan plane by employing the spherical mirror and arranging the scanner at a position of a specific optical path length with respect to the spherical mirror. The present invention utilizes the result of the theoretical discussion on the spherical mirror. The proportional coefficient k which specifies the position of the scanner is introduced to derive the equation for calculating the radius of the circle of confusion and the radii are calculated for various values of k. As a result, it has been found that, for the spherical mirror, the variation of the equivalent diameter of the circle of confusion is small when $0.78 \leq k \leq 0.84$ and the variation of the equivalent diameter can be minimized by selecting a specific value of k within the above range depending on the maximum scanning angle.

In the embodiment of the surface defect detecting apparatus which utilizes the above teaching, the spherical mirror is used as the concave mirror and the fine adjusting mechanism is provided to attain the optimum value of k. As a result, the scanning spot having a sufficiently small variation of the light intensity is attained over a wide range.

The scan lens having a large diameter constructed by a conventional compound lens is very expensive and cannot always exhibit an excellent characteristic of small variation of the radius of the circle of confusion. On the other hand, in the present scanning system which uses the spherical mirror, by the proper selection of the proportional coefficient k and the provision of the mechanism for precisely setting the selected value of k, the scan spot having a sufficiently small variation in the light intensity can be readily and economically attained for a plate of large diameter such as 125 mm in diameter.

We claim:

1. A light beam scanning apparatus for projecting a light beam swept by a light scanner to a concave mirror and scanning by a light beam spot reflected and focused by said concave mirror a surface of an object arranged to oppose to said concave mirror at a position spaced from said concave mirror by a distance substantially equal to a focal distance f of said concave mirror; characterized in that said concave mirror is a spherical mirror and an optical path length between said light scanner and said spherical mirror is set between about 0.78 f and about 0.84 f.

2. A light beam scanning apparatus according to claim 1 further comprising a planar mirror for reflecting said light beam arranged in the optical path between said light scanner and said spherical mirror.

3. A light beam scanning apparatus according to claim 1 wherein said light scanner includes a fine adjusting mechanism for adjusting said optical path length.

4. A light beam scanning apparatus comprising:
a source of substantially parallel light beam;
a scanning means for angularly scanning said parallel light beam;
a spherical mirror having a focal length f and disposed to receive said scanned parallel light beam at a position optically distanced from said scanning means by kf where k is between about 0.78 and about 0.84, so as to reflect said parallel light beam;
an object plane disposed substantially optically normal to the reflected light beam at a position optically distanced substantially by the focal length f from said spherical mirror.

5. A light beam scanning apparatus according to claim 4, wherein said scanning means, said spherical mirror and said object plane are so disposed to constitute an off-axis configuration.

6. A light beam scanning apparatus according to claim 5, further including a beam bender for bending said beam scanned by said scanning means and directed to said spherical mirror.

7. A light beam scanning apparatus according to claim 4, 5 or 6, wherein said source of light beam includes a laser source and said scanning means includes a rotating mirror.

8. A method of scanning a light spot on an object plane comprising the steps of:
generating a substantially parallel light beam;

angularly scanning said parallel light beam;
reflecting said parallel light beam by a spherical mirror having a focal length f, at a position optically distanced by kf from the point of scanning, where k is between about 0.78 and about 0.84;
impinging said reflected light beam substantially optically normal to an object plane at a position optically distanced substantially by the focal length f from said spherical mirror.

* * * * *